United States Patent [19]

Schreiber

[11] Patent Number: 5,016,198
[45] Date of Patent: May 14, 1991

[54] MEASURING SYSTEM THAT ALLOCATES A MEASURED VALUE TO A MEASURABLE VARIABLE AND MEASURMENT TRANSDUCER THEREOF

[75] Inventor: Hans Schreiber, Lappersdorf, Fed. Rep. of Germany

[73] Assignee: Siemens Aktiengesellschaft, Berlin and Munich, Fed. Rep. of Germany

[21] Appl. No.: 496,123

[22] Filed: Mar. 19, 1990

Related U.S. Application Data

[63] Continuation of Ser. No. 363,380, Jun. 6, 1989, abandoned, which is a continuation of Ser. No. 30,077, Mar. 25, 1987, abandoned.

[30] Foreign Application Priority Data

Apr. 25, 1986 [DE]  Fed. Rep. of Germany ....... 3614118

[51] Int. Cl.$^5$ ............................................. G06F 15/00
[52] U.S. Cl. ................................. 364/550; 73/1 R; 73/116; 364/571.02; 364/577
[58] Field of Search .............. 364/550, 551.01, 571.02, 364/571.05, 579, 577; 73/708, 1 R, 32 R, 37, 116

[56] References Cited

U.S. PATENT DOCUMENTS

| 4,446,715 | 5/1984 | Bailey | 73/1 R |
| 4,468,968 | 9/1984 | Kee | 364/571 |
| 4,481,596 | 11/1984 | Townzen | 364/571.05 |
| 4,672,566 | 6/1987 | Asano et al. | 364/550 |
| 4,701,867 | 10/1987 | Brüggemann | 364/550 |
| 4,707,796 | 11/1987 | Calabro et al. | 364/550 |

FOREIGN PATENT DOCUMENTS 0079086  5/1983  European Pat. Off. .
0078592  6/1983  European Pat. Off. .
2065890  7/1981  United Kingdom .

Primary Examiner—Parshotam S. Lall
Assistant Examiner—Brian M. Mattson

[57] ABSTRACT

A type characteristic of a measurement transducer is stored in a type memory of an evaluator. Deviations of the type characteristic from the individual characteristic of the measurement transducer are defined by individual values which accompany the measurement transducer in a coding memory. A computer of the evaluator identifies the corresponding measured value for every electrical measured signal from the type characteristic and from the individual values.

18 Claims, 1 Drawing Sheet

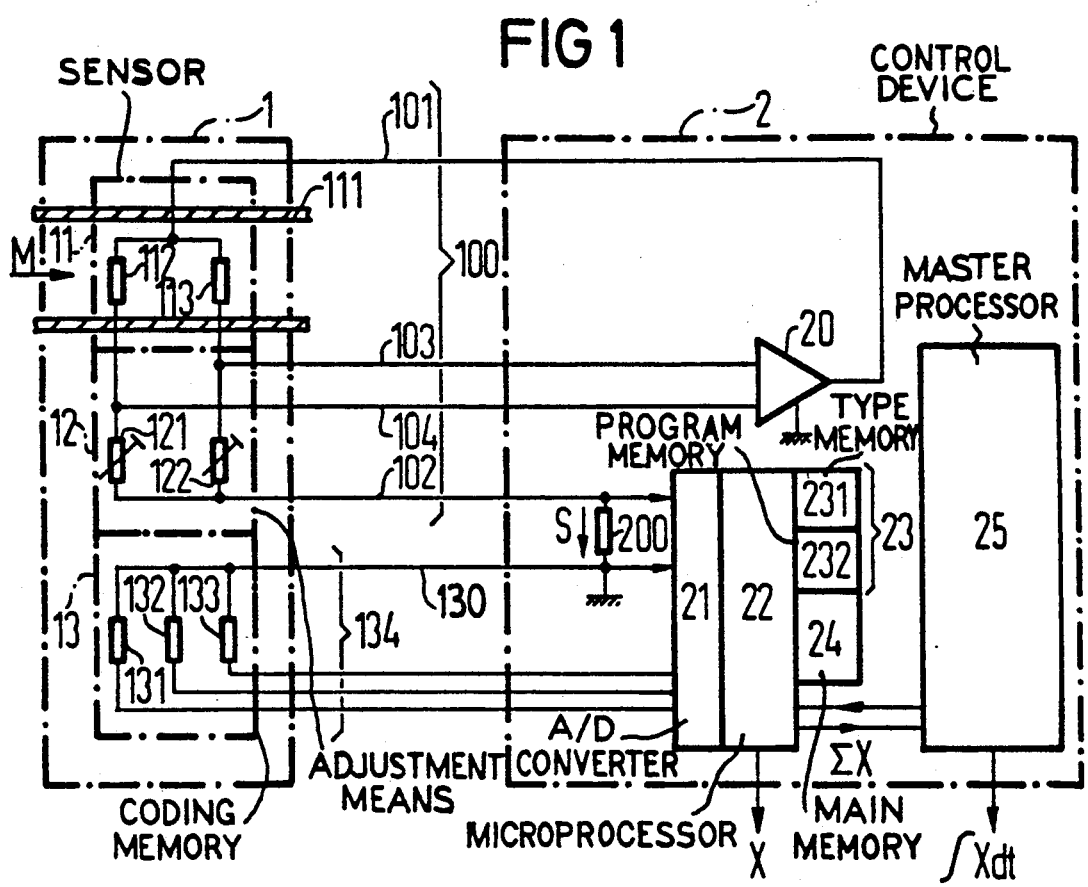
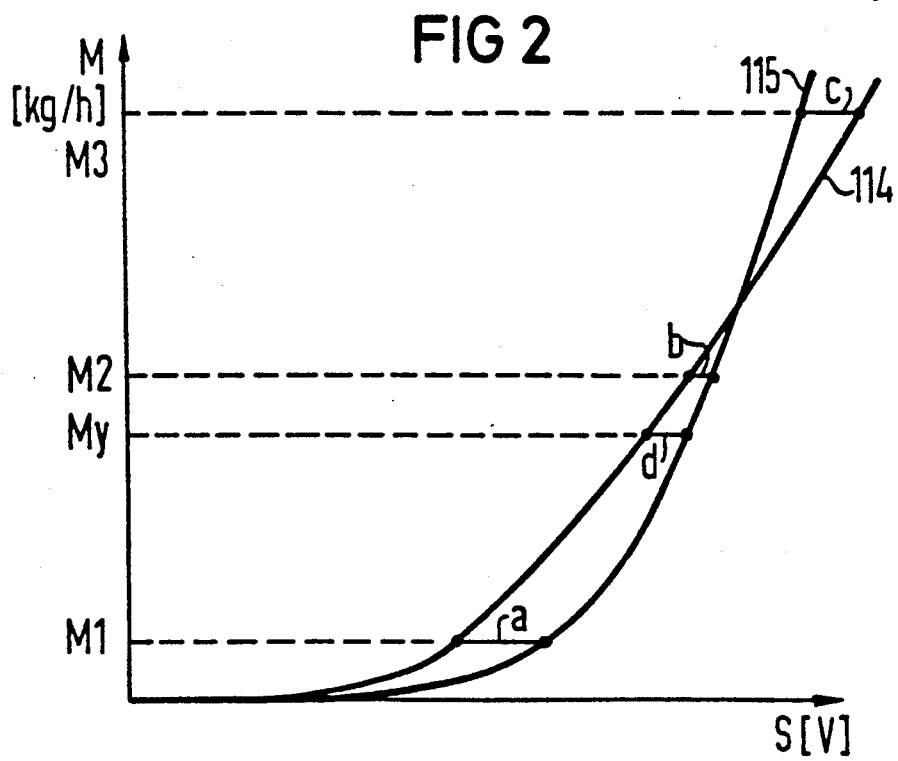

MEASURING SYSTEM THAT ALLOCATES A MEASURED VALUE TO A MEASURABLE VARIABLE AND MEASURMENT TRANSDUCER THEREOF

This is a continuation of application Ser. No. 363,380 filed June 6, 1989, now abandoned, which is a continuation of application Ser. No. 030,077 filed Mar. 25, 1987, now abandoned.

BACKGROUND OF THE INVENTION

The invention is directed to a measuring system comprising a measurement transducer and a following control device wherein a measured value is allocated to a parameter being measured (the "measured parameter"). The measurement transducer has an individual characteristic associated with it and contains a sensor for the measured parameter. The measurement transducer supplies an electrical measured signal dependent on the measured parameter.

A known measuring system of this type is disclosed in EP 079,086, incorporated herein. The measurement transducer represents a unit formed of the sensor and of a coding memory that contains characteristic data for the sensor. These characteristic data are, for example, the values for the null drift, the temperature behavior, etc., of the sensor signal referred to as the values of a standard sensor signal. The control device connected to the measurement transducer interrogates the content of the coding memory and corrects the sensor signals coming from the sensor therewith. This occurs by linear changes of this sensor signal in the control device over the entire bandwidth of the possible sensor signal (influence on gain factors or offset of operational amplifiers and adding up signals).

Such a measuring system is well-suited for the utilization of sensors having linear characteristics. Given employment of sensors having a non-linear characteristic, however, it is no longer possible to correct the sensor signal with identical correction values over its entire bandwidth.

The invention is, therefore, based on the object of providing measuring equipment such that sensors having a nonlinear characteristic can also be employed.

The invention proceeds on the basis of the consideration that a type characteristic can be identified for every type of measurement transducer which fundamentally identifies all measurement transducers of the same type. In accordance with the invention, this type characteristic is defined by type data that are stored in a type memory of the control device. The deviations of the individual characteristic of a measurement transducer from the type characteristic are identified by discrete individual values and accompany the measurement transducer in a coding memory. A computer in the control device then determines a reference point on the individual characteristic from every individual value and from the type characteristic. Proceeding on the basis of these reference points, a measuring program in the program memory of the computer subsequently determines the allocated measured value for every measuring signal.

For this purpose, the measuring program can be fashioned such that an identification regarding the two reference points of the individual characteristic between which a measured value lies is first identified given an incoming measured value. Subsequently, the measured value is identified by one of the known interpolation methods, for example by linear interpolation between the two reference points.

When the measured values must be supplied at a very short interval following one another, then the method set forth presumes a very fast computer. Under such circumstances, it can then be more expedient to first calculate all possible point value pairs of the individual characteristic with a calibration program proceeding on the basis of the individual values and of the type characteristic, and to deposit these in the main memory of the computer such that the corresponding measured parameter for every measured value can be directly read out therefrom.

The invention has particular significance given measurement transducers having a non-linear characteristic. However, it can also be advantageously employed in measurement transducers having a linear characteristic. In this case, for example, one manages with two individual values of which one indicates the axial shift of the individual characteristic compared to the type characteristic in the direction of the abscissa or ordinate, and the second individual value indicates the slope of the individual characteristic.

Any means which contains one or more individual values coded such that at least one individual value can be interrogated and decoded by the evaluator comes into consideration as a coding memory. A simple example is a connecting terminal strip whose posts are partly insulated and partly grounded, so that the connected evaluator can identify a binary number by a resistance measurement via the individual posts. Electrical components such as, for example, capacitors, resistors, etc., come into consideration as analog memories for the coding memory that can be electrically interrogated by the evaluator.

In one embodiment of the invention, the type characteristic is stored as a mathematical characteristic function in the type memory that defines the type characteristic of the measurement transducer with m parameters. The evaluator supplies the m parameters (constants) of this characteristic function by the m individual values from the coding memory of the measurement transducer, these being selected such that the characteristic function of the individual characteristic of the measurement transducer arises therewith.

In an embodiment of the invention described hereafter, the type memory contains the type characteristic in the form of discrete point value pairs and the coding memory contains the deviations of the individual characteristic from the type characteristic for given reference points.

BRIEF DESCRIPTION OF THE DRAWINGS

FIG. 1 illustrates measuring equipment for a measurement of air quantity in the intake pipe of an internal combustion engine; and FIG. 2 shows the curve of the corresponding type and individual characteristic.

DESCRIPTION OF THE PREFERRED EMBODIMENTS

The measuring equipment shown in FIG. 1 is formed of a measurement transducer 1 that is fashioned as a thermally operating air volume meter and is arranged in the hot surround field of the internal combustion engine, namely at the intake pipe 111. The measurement transducer 1 contains a sensor 11 comprising a precision resistor 112 and a heating resistor 113, an adjustment means 12 comprising variable resistors 121, 122, and a coding memory 13 comprising coding resistors 131, 132, and 133.

The precision resistor 112 and the heating resistor 113 are fashioned as platinum thin-film resistors. They are accommodated in the intake pipe 111 of the internal combustion engine.

The precision resistor 112 is connected in series with a variable resistor 121 via an internal junction and forms a first, relatively high-impedance bridge arm. Correspondingly, the heating resistor 113 and the other variable resistor 122 are connected to an internal junction and form a second bridge arm. These bridge arms lie parallel between a connecting line 101 and a return line 102. The internal junctions of the bridge arms are connected to output lines 103, 104. These output lines form a control device connection 100 together with the connecting line 101 and the return line 102.

At one end, the three ohmic coding resistors of the coding memory 13 are connected to a reference line 130 and lead to three coding lines at the other end. The latter form a memory connection 134 together with the reference line.

The control device 2 contains a controlled-gain amplifier 20, a terminating impedance 200, and a computer.

The two inputs of the controlled-gain amplifier are connected to the output lines 103, 104 of the control device connection 100. Its output is connected to the connecting line 101. The return line 102 is conducted to ground via the terminating impedance 200. A known automatic control system arises in this way which keeps the temperature difference between the temperatures of the precision resistor 112 and of the heating resistor 113 at a constant value independently of the air volume flowing through since the controlled-gain amplifier 20 correspondingly varies its output current via the resistors 113, 122 and 200. This current generates a voltage drop at the terminating impedance 200 which represents the measured signal S whose size is dependent on the measured parameter in accordance with the individual characteristic 114 (FIG. 2).

The computer in the control device 2 contains a microprocessor 22 and a master processor 25. At its input side, the microprocessor 22 is preceded by analog-to-digital converters 21. A main memory 24 in the form of a RAM, a type memory 231, and a program memory 232 which are formed by a ROM 23 are also allocated to it. The analog-to-digital converters 21 have a resolution of 8 bits and, accordingly, can supply 256 digital values. The input side of one of these receives the measured signal S in the form of a voltage.

FIG. 2 shows the individual characteristic 114 and the type characteristic 115 of the measurement transducer 1, whereby the measured signal S is entered as a voltage dependent on the measured parameter M in the form of the stream of air volume.

The type characteristic 115 is formed of 256 points of which every one is defined by a point value pair (air volume stream M and voltage S). The type characteristic is identified, for example, in the following way. The measurement of the voltage S of z different measurement transducers 1 given the same air volume stream M determined by a standard yields z voltage values. The mean value or the maximum value of the Gaussian distribution of these z voltage values and the value of the standard of the air volume stream M form a pair of supporting points of the type characteristic 115. This procedure is carried out with a total of y different standards whose sizes are selected such that—as shown on the ordinate in FIG. 2—they mark equidistant points. Thus, z supporting point value pairs of the type characteristic 115 result. The remaining point value pairs of the 256 points of the type characteristic 115 are calculated by a process control computer by known extrapolation such that the first and second derivation of the type characteristic 115 are respectively identical in every point. All 256 point value pairs of the type characteristic are stored in the type memory 231, i.e. in the ROM 23.

The individual characteristic 114 of the measurement transducer 1 is likewise formed of 256 point value pairs. After manufacture of the measurement transducer, however, only three of these point value pairs—referred to below as reference value pairs—in three reference points are identified in the same way as the supporting point value pairs of the type characteristic 115. The deviation of the voltage S of the measurement transducer 1 from the voltage S of the type characteristic 115 given the respectively same air volume stream (M1 through M3) is referenced a, b, c. The amounts are the individual values of the measurement transducer 1 and are stored by correspondingly setting the values of the coding resistors 131, 132, 133 in the coding memory 13.

An operational sign indicates the side toward which the individual characteristic 114 deviates from the type characteristic 115. For example, a deviation toward lower voltage values (cases a, b) has a negative operational sign, and a deviation toward higher voltage values (c) has a positive operational sign. The information about the operational sign is contained in the coding resistors 131, 132, 133, for example in an additional location that is not occupied by the occurring individual values. When the individual values run, for example, from 1 to 50, then the number 43 denotes the value +43, and the value −43 is represented by the number 143.

In order to identify the complete individual characteristic, for example given first initialization of the measuring transducer 1, the microprocessor 22 identifies the size of the coding resistors 131, 132, 133 by resistance measurement with the calibration program in the program memory 232 via the interrogation output 134. With these three values, i.e. the individual values a, b, c, the three reference points of the individual characteristic 114 is calculated with their reference value pairs and are stored in the RAM 24. Proceeding therefrom, the microprocessor 22 calculates the remaining point value pairs of the individual characteristic 114 by linear approximation since the deviating value (d in FIG. 2) given the same air volume stream (My) is calculated for every point value pair of the type characteristic 115. M1 and M2 denote the values of the measured parameter in the two neighboring reference points. All 256 point value pairs of the individual characteristic 114 identified in this way are deposited in the RAM 24 by the microprocessor 22 such that the address of the memory cell having the respectively allocated air volume stream M is allocated to every respectively occurring voltage value of the measured signal S of the measurement transducer 1.

The calculation of the individual characteristic 114 requires a number of seconds. It is therefore carried out only as needed, i.e. upon first initialization, and later, only when the air volume meter is replaced or following outage of the operating voltage (since the content of the RAM 24 is then lost).

The microprocessor 22, therefore, measures the size of the coding resistors 131, 132, 133 every time the internal combustion engine is started. When their size has remained the same in comparison to the value stored at the first initialization, i.e. when the same measurement transducer 1 is still connected, the microprocessor 22 retains the individual characteristic 114 contained in the RAM 24.

In the measuring mode, controlled by a measuring program stored in the ROM 23, the analog-to-digital converter 21 converts the voltage S of the measurement transducer 1 at its input into digital values. The microprocessor 22 uses these digital values to directly address the memory cells having the digital values of the air volume stream M in the RAM, and reads these latter digital values (=unknown X) out.

What is usually required is not the air volume stream M, but the time integral thereof over an integration interval which extends over a predetermined part or over the entire duration of an intake clock of the internal combustion engine. It is, therefore, provided in the measuring program that the microprocessor 22 forms a sum value from the digital values of the air volume stream M incoming during the integration interval.

The calculation of the time integral of the air volume stream M over the integration interval is controlled by the master processor 25. It first forwards the start and stop instruction for the formation of the sum value to the microprocessor 22. The sum value is set to zero at every start instruction, and the summing is initiated. The stop instruction interrogates the sum value and the number of summations carried out. The master processor 25 divides this sum value by the number of completed summations and multiplies by the time that corresponds to an integration interval. The air mass per integration interval thus results.

The microprocessor 22, accordingly, is relieved of the task of controlling the integration. This work division allows the utilization of a simple standard processor that would otherwise be overworked given high rpm's of the internal combustion engine. The master processor 25 does not represent any added expense since, due to auxiliary tasks not addressed here, it is already present. A further advantage of the proposed measuring equipment is that the calculation of the time interval of the air volume stream is possible with high precision without employing linearization means that are otherwise standard. In the solution of the invention, the measured parameter M is directly integrated, not the electrical sensor signal S. The problem of the nonproportionality of the integral of the measured parameter M and of the integral of the measured signal S therefore does not occur.

Of the two components of the measuring equipment, the measurement transducer 1 is more greatly stressed. A replacement by a new measurement transducer of the same type that may become necessary can be undertaken at any time at an arbitrary location without requiring any adaptation to the still-functioning control device.

Although various minor changes and modifications might be proposed by those skilled in the art, it will be understood that I wish to include within the claims of the patent warranted hereon all such changes and modifications as reasonably come within my contribution to the art.

I claim as my invention:

1. A measuring system for determining a value of a measured parameter M, comprising:

sensor means for supplying an electrical measuring signal S having a value which is dependent on a value of the measured parameter M;

control means connected to receive said measured signal S from said sensor means, said control means having a type characteristic memory containing a definition of a type characteristic curve, points of the type characteristic curve defining particular values of parameter M corresponding to particular values for measured signal S, said definition of said type characteristic curve being based on an average of individual characteristic curves of a plurality of sensor means of a same type as the sensor means connected to the control means, each of said individual characteristic curves defining values of signal S for corresponding values of parameter M for each of the plurality of sensor means;

said sensor means connected to the control means including a coding memory means containing data for defining as individual characteristic curve of the connected sensor means;

said control means including means for defining said individual characteristic curve of the connected sensor means by use of said data from the coding memory means and said points defining the type characteristic curve, and including memory means for storing the defined individual characteristic curve; and said control means determining from the defined individual characteristic curve of the connected sensor an output value X corresponding to a measured value S input to the control means.

2. The measuring system according to claim 1 wherein said definition of the type characteristic curve in the type characteristic memory comprises a plurality of points stored in the memory, and wherein said data contained in the coding memory means of the control means defines for at least three given values of parameter M corresponding deviation values indicative of an amount by which the electrical measured signal S for the sensor means deviates from said type characteristic curve, and wherein said means for defining of said control means uses said corresponding deviation values from the coding memory means and said plurality of points defining the type characteristic curve to define said individual characteristic curve of the specific connected sensor means.

3. The measuring system according to claim 2 wherein said control means uses the deviation values from the coding memory means to calculate by an extrapolation procedure additional values from the type characteristic curve.

4. The system according to claim 3 wherein a and b represent said coding memory means deviations, $M_1$ and $M_2$ represent the values of parameter M corresponding to the deviation values a and b, $M_y$ represents a parameter value of parameter M for a desired deviation value d to be calculated between deviation values a and b and which represents a deviation of the individual characteristic curve from the type characteristic curve for such parameter value $M_y$, and wherein said control device means calculates the deviation value d by a linear approximation between deviation values a and b.

5. The system according to claim 2 wherein the type characteristic curve and the individual characteristic curves are non-linear.

6. A method for measuring a value of a parameter M by use of an individual sensor to be connected to a control means, and wherein each individual sensor to be connected to the control means may have a different type characteristic curve, comprising steps of:
   measuring a plurality of sensors of a same type as said individual sensor to be connected to the control means to determine a definition of an averaged type characteristic curve based on an average of characteristic curves of said measured sensors;
   providing the individual sensor with a coding memory having data stored therein used for defining an individual characteristic curve of the connected individual sensor;
   defining said individual characteristic curve by using the data from the coding memory with the definition of the averaged type characteristic curve; and
   determining an output value X depending on a measurement of parameter M by use of the individual characteristic curve and a corresponding value S input to the control means.

7. The method according to claim 6 wherein the definition of the averaged type characteristic curve comprises a plurality of points of the curve; and the data stored in the coding memory of the individual sensor defines a deviation of a voltage S output by the individual sensor relative to the type characteristic curve for each of a given number of values of parameter M; and defining the individual characteristic curve for the individual sensor by calculating additional deviations of value S for other values of parameter M lying between two of the coding memory values of parameter M and then calculating points for the individual characteristic curve by use of said type characteristic curve together with the calculated deviations of value S.

8. The method of claim 6 wherein the coding memory data defines three deviations of voltage S corresponding to three parameter values of the individual characteristic curve.

9. The method according to claim 6 wherein the averaged type characteristic curve is non-linear, the individual sensors are non-linear, and the individual type characteristic curve of the individual sensors is non-linear.

10. A measuring system for determining a value X of a measured parameter M, comprising:
    sensor means for supplying an electrical measured signal S having a value which is dependent on a value of the measured parameter M;
    control means having an input connected to receive said measured signal S from said sensor means, said control device means having a type characteristic memory containing a given type characteristic curve, each point on it defining corresponding values of parameter M and measured signal S;
    said sensor means connected to the control device means including a coding memory means containing data for defining an individual characteristic curve of the connected sensor means;
    said control means including means for computing a series of points defining said individual characteristic curve of the sensor means form the data in the coding memory means and said type characteristic curve in the type characteristic memory, each point defining an output value X for a correlated measured signal S, and including individual memory means for storing and reading said points of the individual characteristic curve; and
    said control means employing the individual memory means to read out a correlated output value X for each measured signal S at the input of the control means.

11. The measuring system according to claim 10 wherein said type characteristic memory comprises a plurality of points stored in the memory, and wherein said data contained in the coding memory means of the control means defines for each one of a given number of given values of parameter M a corresponding deviation value indicative of an amount by which the electrical measured signal S of the sensor means deviates from said type characteristic curve, and wherein said control means uses said corresponding deviation values and said plurality of points defining the type characteristic curve to define said individual characteristic curve of the connected sensor means.

12. The measuring system according to claim 11 wherein said control means uses the deviation values from the coding memory means t calculate by an extrapolation procedure additional deviation values from the type characteristic curve.

13. The measuring system according to claim 12 wherein a and b represent said coding memory means deviations, $M_1$ and $M_2$ represent the values of parameter M corresponding to the deviation values a and b, $M_y$ represents a parameter value of parameter M for a desired deviation value d to be calculated between deviation values a and b and which represents a deviation of the individual characteristic curve from the type characteristic curve for such parameter value $M_y$, and wherein said control means calculates the deviation value d by a linear extrapolation between deviation values a and b.

14. The system according to claim 11 wherein the type characteristic curve and the individual characteristic curves are non-linear.

15. A method for measuring a value of a parameter M by use of an individual sensor to be connected to a control means, comprising steps of:
    providing the individual sensor with a coding memory having data stored therein for defining an individual characteristic curve of the individual sensor;
    providing and storing a type characteristic curve;
    defining said individual characteristic curve by using the data from the coding memory and from the stored type characteristic curve; and
    determining an output value X directly from the individual characteristic curve depending on a measurement of parameter M and the corresponding measured signal S input to the control means.

16. The method according to claim 15 wherein the type characteristic curve comprises a plurality of points of the curve; and the data stored in the coding memory of the individual sensor defines a deviation of a voltage S output by the individual sensor relative to a corresponding voltage S of the type characteristic curve for each of a given number of values of parameter M; and defining the individual characteristic curve for the individual sensor by calculating additional deviations of measured signal S for additional values of parameter M lying between two of the coding memory values of parameter M and then calculating points for the individual characteristic curve with said type characteristic curve together with said additional deviations.

17. The method of claim 15 wherein the coding memory data defines three deviations of voltage S corresponding to three parameter values of the individual characteristic curve.

18. The method according to claim 15 wherein the type characteristic curve is non-linear, the individual sensor is non-linear, and the individual type characteristic curve of the individual sensor is non-linear.

* * * * *